UNITED STATES PATENT OFFICE.

WILLIAM D. RICHARDSON, OF CHICAGO, ILLINOIS, ASSIGNOR TO SWIFT & COMPANY, OF CHICAGO, ILLINOIS, A CORPORATION OF ILLINOIS.

PROCESS OF HYDROGENATING OILS OR FATS.

1,257,397.  Specification of Letters Patent.  Patented Feb. 26, 1918.

No Drawing.  Application filed November 11, 1912. Serial No. 730,746.

*To all whom it may concern:*

Be it known that I, WILLIAM D. RICHARDSON, a citizen of the United States of America, and a resident of Chicago, county of Cook, and State of Illinois, have invented certain new and useful Improvements in Processes of Hydrogenating Oils or Fats, of which the following is a specification.

The object of this invention is to provide an improved method of hydrogenating oils or fats to harden or solidify them.

As is now well known oils and the oily unsaturated acids may be converted into saturated bodies, or fats, of higher melting point, or "hardened" by treating with hydrogen in the presence of certain metals. Nickel is the one generally used as it is more active than cobalt, iron, copper, etc. Usually the active nickel is prepared by reducing the oxid by hydrogen at a low temperature; this operation being generally performed by heating the nitrate until it is converted into oxid and then reducing this oxid in a tube. The presence of chlorids, sulfates, etc., is disadvantageous as these bodies act as "poisons." The whole operation is expensive, laborious and tedious. It is an object of the present invention to economize in time, labor and cost by directly preparing a catalyst from solid bodies of metal, best nickel; massive metal being directly eroded by the action of the electric arc to produce metal of such a state of fineness or subdivision that in the presence of a liquid it is adapted to form a colloidal solution.

This object is accomplished by the following described process:

I first put in a suitable container a quantity of liquid or semi-liquid material, which may be water, and then submerge two metallic pieces in this material and connect them with a suitable device for supplying an electric current through said pieces. These pieces serve as electrodes, being suitably spaced apart and provided with sufficient current to produce an electric arc across the gap between them, and to cause part of the metal of said electrodes to disintegrate and to be diffused in finely divided form in said material. The material of electrodes suitable for this purpose may be nickel, copper, platinum, palladium, iron, or their alloys, or other metals or alloys. These electrodes may be conveniently used in the form of rods, and the electric current may be supplied by a hand feed or an automatic arc lamp mechanism in which the rods are clamped. The rods may be entirely or partly submerged in the material before mentioned. The electric current is operated preferably at a voltage of from 40 to 150, and is preferably a direct current.

The arc is allowed to continue until the desired amount of disintegrated or finely divided metal has been produced by its eroding action. The finely divided metal is then separated from the liquid or semi-liquid material, or from the greater part thereof, as may be done by filtering it out, or by evaporating the liquid, and the finely divided metal thus obtained is then introduced into the unsaturated compound, such as the fatty oil or fat to be hydrogenated, and is mixed therewith in the proportion of about 1 to 3 per cent. of the metal to the mixture, by weight. More or less may be used if desired. Hardening is effected by hydrogen or a gas containing hydrogen in any of the usual ways preferably done under heat and pressure.

When operating under about 40 pounds pressure and with a temperature of about 160 degrees C., the process of hardening or solidifying may be completed in from one to eight hours, depending upon the percentage of the finely divided metal used, the kind of fat or oil being hardened, the rapidity of agitation, etc., and upon the degree of hardness desired. After the hydrogenation of the oil or fat has been accomplished, the finely divided metal may be removed from the mass as by settling, straining, or filtering.

I claim:—

1. In the hardening of oily and fatty material the process which comprises treating a body of such material with hydrogen in the presence of electrically disintegrated metal.

2. In the hardening of oily and fatty material the process which comprises electrically disintegrating a metal in a fluid medium, removing such medium, adding the disintegrated metal to a body of such material and treating such body with hydrogen.

3. In the hardening of oily and fatty material the process which comprises electrically disintegrating a metal in water, removing the water from the disintegrated metal, adding the disintegrated metal to a body of such material and treating the body with hydrogen.

4. In the hardening of oily and fatty material the process which comprises heating a body of such material with hydrogen in the presence of electrically disintegrated nickel.

5. In the hardening of oily and fatty material the process which comprises treating cally disintegrating nickel in a fluid medium, removing such medium, adding the disintegrated nickel to a body of such material and treating such body with hydrogen.

6. In the hardening of oily and fatty material the process which comprises electrically disintegrating nickel in water, removing the water from the disintegrated nickel, adding the disintegrated nickel to a body of such material and treating the body with hydrogen.

Signed at Chicago this 25 day of October, 1912.

WILLIAM D. RICHARDSON.

Witnesses:
   I. O. BEATTY,
   ARTHUR CORBISHLEY.

It is hereby certified that in Letters Patent No. 1,257,397, granted February 26, 1918, upon the application of William D. Richardson, of Chicago, Illinois, for an improvement in "Processes of Hydrogenating Oils or Fats," errors appear in the printed specification requiring correction as follows: Page 2, line 5, claim 4, for the word "heating" read *treating;* same page, line 10, claim 5, for the word "treating" read the syllables *electri-;* and that the said Letters Patent should be read with these corrections therein that the same may conform to the record of the case in the Patent Office.

Signed and sealed this 16th day of April, A. D., 1918.

[SEAL.]

F. W. H. CLAY,

*Acting Commissioner of Patents.*

[Cl. 87- -12.